(12) United States Patent
Yang et al.

(10) Patent No.: US 6,525,123 B1
(45) Date of Patent: Feb. 25, 2003

(54) COMPATIBLE BLEND SYSTEMS FROM ETHYLENE VINYL ALCOHOL AND OXYGEN SCAVENGING POLYMERS

(75) Inventors: Hu Yang, San Ramon, CA (US); Ta Yen Ching, Novato, CA (US); Gangfeng Cai, Danville, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 09/575,094

(22) Filed: May 19, 2000

(51) Int. Cl.$^7$ ................................................ C08L 29/04
(52) U.S. Cl. ........................ 524/398; 524/401; 524/403; 524/413; 524/435; 525/47
(58) Field of Search ........................... 525/57; 524/435, 524/413, 398, 401, 403

(56) References Cited

U.S. PATENT DOCUMENTS

| | | |
|---|---|---|
| 3,497,571 A | 2/1970 | Tellier et al. |
| 3,536,687 A | 10/1970 | Nordstrom |
| 4,415,710 A | 11/1983 | Barnabeo et al. |
| 4,524,201 A | 6/1985 | Barnabeo et al. |
| 5,021,515 A | 6/1991 | Cochran et al. |
| 5,116,916 A | 5/1992 | Young |
| 5,153,038 A | 10/1992 | Koyama et al. |
| 5,211,875 A | 5/1993 | Speer et al. |
| 5,274,024 A | 12/1993 | Koyama et al. |
| 5,281,360 A | 1/1994 | Hong et al. |
| 5,346,644 A | 9/1994 | Speer et al. |
| 5,356,676 A | 10/1994 | vonWiddern et al. |
| 5,425,896 A | 6/1995 | Speer et al. |
| 5,466,756 A | 11/1995 | Roach et al. |
| 5,498,364 A | 3/1996 | Speer et al. |
| 5,547,765 A | 8/1996 | Degrassi et al. |
| 5,627,239 A | 5/1997 | Ching et al. |
| 5,641,825 A | 6/1997 | Bacskai et al. |
| 5,656,692 A | 8/1997 | Hayes |
| 5,660,761 A | 8/1997 | Katsumoto et al. |
| 5,700,554 A | 12/1997 | Speer et al. |
| 5,707,750 A | 1/1998 | Degrassi et al. |
| 5,716,715 A | 2/1998 | Degrassi et al. |
| 5,723,567 A | 3/1998 | Hewel et al. |
| 5,736,616 A | 4/1998 | Ching et al. |
| 5,759,653 A | 6/1998 | Collette et al. |
| 5,763,095 A | 6/1998 | Ramesh et al. |
| 5,776,361 A | 7/1998 | Katsumoto et al. |
| 5,837,158 A | 11/1998 | Shepodd et al. |
| 5,859,145 A | 1/1999 | Ching et al. |
| 5,866,649 A | 2/1999 | Hong et al. |
| 6,057,013 A | 5/2000 | Ching et al. |
| 6,063,307 A | 5/2000 | Shepodd et al. |
| 6,063,417 A | 5/2000 | Paleari et al. |
| 6,083,585 A | 7/2000 | Cahill et al. |
| 6,143,197 A * | 11/2000 | Gauthier et al. |
| 6,254,803 B1 * | 7/2001 | Mathews et al. |
| 6,254,804 B1 * | 7/2001 | Mathews et al. |
| 6,313,241 B1 * | 11/2001 | Gauthier et al. |
| 6,333,087 B1 * | 12/2001 | Jerdee et al. |
| 2001/0008662 A1 * | 7/2001 | Blinka et al. |

FOREIGN PATENT DOCUMENTS

| | | |
|---|---|---|
| EP | 0258506 A1 | 3/1988 |
| EP | 0 525 240 | 2/1993 |
| EP | 0987103 A1 | 3/2000 |
| EP | 1 033 080 | 9/2000 |
| JP | 57-185349 | 11/1982 |
| JP | 2255747 A2 | 10/1990 |
| JP | 3188146 A2 | 8/1991 |
| JP | 5077352 A2 | 3/1993 |
| WO | WO89/01012 | 2/1989 |
| WO | WO 91/18039 | 11/1991 |
| WO | WO95/07180 | 3/1995 |
| WO | WO 99/15433 | 4/1999 |
| WO | WO 99/48963 | 9/1999 |

OTHER PUBLICATIONS

Ching et al., "Tasteless Oxygen Scavenging Polymers: A New Platform Technology for Food Packaging Based on Controlled Oxidation," *Oxygen Absorber . . . 2001 and Beyond*, OSP Conference, pp. 1–8 (Chicago, Jun. 19–20, 2000).

*Beer in PET*, Part I of III (Packaging Strategies, Inc., eds., West Chester, PA) (1999).

PCT/US01/16172 International Search Report (Jun. 5, 2002).

* cited by examiner

*Primary Examiner*—Jeffrey Mullis
(74) *Attorney, Agent, or Firm*—Williams, Morgan & Amerson, P.C.

(57) ABSTRACT

Herein is disclosed an oxygen barrier composition comprising ethylene/vinyl alcohol copolymer (EVOH), an oxygen scavenging polymer, and a transition metal salt. The composition can be in the form of a physical blend or a cross-linked blend, and can further comprise a compatibilizer, a transesterification catalyst, or both. Also disclosed is a packaging article comprising at least one high oxygen barrier layer comprising the blend of EVOH, the oxygen scavenging polymer, and the transition metal salt. The packaging article can be a single-layer or a multilayer article, and can be flexible or rigid. A multilayer packaging article can further comprise a structural layer or layers, an oxygen barrier layer, an oxygen scavenging layer, an oxygen permeable layer or layers, or an adhesive layer or layers, among others. In addition, herein is disclosed a method of making the blend of EVOH, the oxygen scavenging polymer, and the transition metal salt, comprising providing and blending the materials. The blend can be used in a method of making an oxygen scavenging packaging article.

21 Claims, No Drawings

000
COMPATIBLE BLEND SYSTEMS FROM ETHYLENE VINYL ALCOHOL AND OXYGEN SCAVENGING POLYMERS

BACKGROUND OF THE INVENTION

1. Field of the Invention

The present invention relates generally to the field of oxygen scavenging polymers. More particularly, it concerns blends of ethylene/vinyl alcohol copolymers (EVOH) with oxygen scavenging polymers, methods of making the blends, packaging articles comprising the blends, and methods of making the packaging articles.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, technique for limiting oxygen exposure involves incorporating an oxygen scavenger into the packaging structure. Incorporation of a scavenger in the package can scavenge environmental oxygen as it diffuses into the packaging structure, as well as scavenging residual oxygen present inside the package upon filling. Generally, the oxygen scavenger functions by irreversibly reacting with oxygen, and as a result, there exists a maximum amount of oxygen (the "oxygen scavenging capacity") that the scavenger can scavenge. However, increasing the oxygen scavenging capacity by increasing the quantity of the oxygen scavenging polymer has the disadvantage of, typically, impairing the structural properties of the packaging article, as well as increasing the cost of materials and the cost or complexity of processing.

From this, it will be recognized that limiting oxygen ingress into the packaging article is beneficial. If oxygen ingress into the packaging article is limited, less of the oxygen scavenging polymer will be required, and less can be used, thus improving the physical properties and processing of the packaging article. This is especially significant for products that are oxygen-sensitive but otherwise fairly resistant to spoilage, and are thus capable of shelf-lives on the order of at least months, or up to a year or more, such as beer or wine.

Ethylene/vinyl alcohol copolymer (EVOH) is widely known for having excellent barrier properties to gases (such as $O_2$ and $CO_2$) and other fluids, and has found wide use in packaging applications where barrier properties are desired. However, it is generally regarded as an insufficient oxygen barrier for packaging applications which require very strong oxygen barrier properties over a long period of time, such as beer packaging.

Therefore, it would be desirable to have a packaging article comprising EVOH and an additional component or components, which packaging article would be better suited for providing a very strong oxygen barrier over a long period of time than are packaging articles currently known.

Beer in PET, Part I of III (Packaging Strategies, Inc., eds., West Chester, Pa.) (1999), reports the reputed testing of a blend of an oxygen scavenger and an ethylene/vinyl alcohol copolymer (EVOH) in a packaging article for packaging beer. The identity of the oxygen scavenger, and the proportions of the oxygen scavenger and EVOH in the blend, were not reported.

SUMMARY OF THE INVENTION

In one set of embodiments, the present invention relates to a composition, comprising a blend of an ethylene/vinyl alcohol copolymer (EVOH) and an oxygen scavenging polymer. In one embodiment, the composition can be in the form of a cross-linked blend, and can further comprise a compatibilizer or a catalyst. Preferably, if the blend is cross-linked, it is cross-linked by transesterification.

In a related embodiment, the present invention also relates to a packaging article comprising at least one layer comprising the blend of EVOH and an oxygen scavenging polymer. The packaging article can be a single-layer or a multilayer article, and can be flexible or rigid. A multilayer packaging article can further comprise a structural layer or layers, an oxygen barrier layer, an oxygen scavenging layer, an oxygen permeable layer or layers, or an adhesive layer or layers, among others.

In yet another embodiment, the present invention relates to a method of making the blend of EVOH and an oxygen scavenging polymer, comprising providing EVOH and the oxygen scavenging polymer, and blending the materials. The blending step can further comprise cross-linking of the materials, such as by transesterification.

The present invention provides packaging articles that have a very strong oxygen barrier for a long period of time, by taking advantage of the inherent oxygen barrier property of EVOH and the oxygen scavenging property of the oxygen scavenging polymer. The present invention also provides packaging articles having the advantages of providing a $CO_2$ barrier (useful in retaining the carbonation of packaged soft drinks, beer, and sparkling wines) and comprising a blend of EVOH and the oxygen scavenging polymer which has good clarity and is readily processible into a variety of formulations.

DESCRIPTION OF ILLUSTRATIVE EMBODIMENTS

Oxygen barrier compositions

In one embodiment, the present invention relates to a composition, comprising a blend of an ethylene/vinyl alcohol copolymer (EVOH) and an oxygen scavenging polymer. Such a composition is useful as a component of a high oxygen barrier layer of a packaging article. By "high oxygen barrier layer" is meant a layer comprising the blend of EVOH and the oxygen scavenging polymer.

Packaging articles typically come in several forms including a single layer film, a multilayer film, a single layer rigid article, or a multilayer rigid article. Typical rigid or semi-rigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material.

The packaging article comprising the oxygen barrier composition can be used to package any product for which it is desirable to inhibit oxygen damage during storage, e.g. food, beverage, pharmaceuticals, medical products, corrodible metals, or electronic devices. It is especially useful for packaging products for which it is desirable to maintain a high oxygen barrier for a long period of time, e.g. beer, wine, and other beverages. It is also especially useful for packaging products for which it is desirable to retain carbon dioxide, e.g. beer, sparkling wine, and soft drinks.

The packaging article comprising the oxygen barrier composition can comprise a single layer comprising the composition, or a high oxygen barrier layer and additional layers, such as an oxygen scavenging layer, a conventional oxygen barrier layer (e.g. comprising EVOH or another known barrier compound, but not comprising an oxygen scavenging polymer), a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

The packaging article can comprise any oxygen barrier composition described below.

As stated above, the oxygen barrier composition comprises a blend of an ethylene/vinyl alcohol copolymer (EVOH) and an oxygen scavenging polymer.

The ethylene/vinyl alcohol copolymer can comprise any proportion of ethylene and vinyl alcohol units, typically from about 5 mol % ethylene/95 mol % vinyl alcohol to about 95 mol % ethylene/5 mol % vinyl alcohol, preferably from about 20 mol % ethylene/80 mol % vinyl alcohol to about 80 mol % ethylene/20 mol % vinyl alcohol.

The oxygen scavenging polymer can be any organic compound that irreversibly reacts with oxygen. The oxygen scavenging polymer comprises a hydrocarbon group or groups and a polymeric backbone. The hydrocarbon can be saturated or unsaturated, and substituted or unsubstituted. Examples of such hydrocarbons include, but are not limited to, diene polymers such as polyisoprene, polybutadiene, and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Examples of substituted hydrocarbons include, but are not limited to, those with oxygen-containing moieties, such as esters, carboxylic acids, aldehydes, ethers, ketones, or alcohols. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from allyl (meth)acrylates, or polymers containing nitrogen, such as nylon or MXD6, among others.

Preferably, the oxygen scavenging polymer comprises an ethylenic backbone and at least one cyclic olefinic pendant group. More preferably, the cyclic olefinic pendant group is a cycloalkenyl group having the structure I:

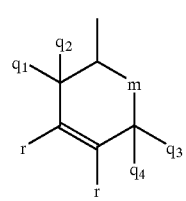

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

In one preferred embodiment, the oxygen scavenging compound is ethylene/vinyl cyclohexene copolymer (EVCH).

Preferably, the oxygen scavenging polymer further comprises a linking group linking the ethylenic backbone to the cyclic olefinic group. The linking group is selected from:

—O—$(CHR)_n$—; —(C=O)—O—$(CHR)_n$—; —NH—$(CHR)_n$—; —O—(C=O)—$(CHR)_n$—; —(C=O)—NH—$(CHR)_n$—; or —(C=O)—O—CHOH—$CH_2$—O—.

More preferably, the cyclic olefinic group is a cycloalkenyl group having the structure I. Even more preferably, in structure I, n is 1, and $q_1$, $q_2$, $q_3$, $q_4$, and r are each hydrogen. Most preferably, the oxygen scavenging polymer is ethylene/methyl acrylate/cyclohexenylmethyl acrylate (EMCM) or cyclohexenylmethyl acrylate homopolymer (CHAA).

The blend can comprise from about 0.1% to about 50% of the oxygen scavenging polymer by weight. Preferably, the blend comprises from about 5% to about 30% of the oxygen scavenging polymer by weight.

The blend makes up at least about 50%, preferably at least about 80%, more preferably at least about 90%, most preferably at least about 95%, by weight of the oxygen barrier composition, with the remainder made up of other additives, as described below.

The oxygen barrier composition comprising EVOH and the oxygen scavenging polymer can be either a physical blend or a cross-linked physical blend, both of which are herein referred to as a "blend." Further additives that may optionally be used in the blend, or possibly only the cross-linked blend, will be described below.

Typically, the blend is made up with EVOH polymer as a matrix or dispersing phase, with the oxygen scavenging polymer as the dispersed phase. Because oxygen diffusion is limited through the EVOH matrix, oxygen scavenging by the oxygen scavenging polymer phase would become highly efficient, thus allowing enhancement of the oxygen barrier properties of the blend relative to that of EVOH alone.

The blend can have appropriate processability and physical properties with a desired morphology in the blend system. This typically occurs if the oxygen scavenging polymer can be dispersed into EVOH, which is especially likely the more polar the oxygen scavenging polymer. It is desirable for the oxygen scavenging polymer phase to be present in the blend in a laminar or a platelet form upon orientation of the high oxygen barrier layer during production of the packaging article; this has the benefit of further increasing the efficiency of oxygen scavenging.

In some cases, most likely when the blend is intended for use in a rigid packaging article, the processability or the physical properties of the simple blend may prove to be inadequate. To overcome this, the blend may further comprise a compatibilizer in order to stabilize its morphology by enhancing interphase cohesion. A "compatibilizer" is any compound that functions to enhance interphase cohesion between the EVOH and the oxygen scavenging polymer. A preferred compatibilizer is a block copolymer of EVOH or a polymer similar thereto (such as another ethylene/substituted vinyl copolymer, e.g. ethylene/vinyl acetate copolymer or ethylene/styrene copolymer; polyacrylonitrile; polyvinyl chloride (PVC); poly(vinylidene dichloride); polyethylene terephthalate (PET); polyethylene napthalate; or polyamide; among others) and EMCM, EVCH, CHAA, or a polymer similar thereto (such as another polymer with an ethylenic backbone and a cycloalkenyl side chain).

In the compatibilizer, the blocks of EVOH or a polymer similar thereto can be linked to the blocks of EMCM, EVCH, CHAA, or a polymer similar thereto by any appropriate linkage, such as ester, carbonate, amide, ether, urethane, or urea linkages. The linkages can be readily formed by attaching components of the linkage to the ends of the two different types of blocks, or by forming the linkage from components thereof already present at the ends of the two different types of blocks, such as hydroxy and ester components of an ester linkage such as is used in polyester synthesis. The latter technique can be used with monomers of the EVOH or polymer similar thereto and the EMCM, EVCH, CHAA, or polymer similar thereto, or with blocks of the two types of monomers. Alternatively, the linkages can be formed by making monomers or blocks of EMCM, EVCH, CHAA, or a polymer similar thereto with reactive end groups, such as hydroxy, ester, or acid end groups, and then blend it with the EVOH or polymer similar thereto (for example, PET) to form block polymers in situ during blending.

More preferably, the compatibilizer is a block copolymer of EVOH with one of EMCM, EVCH, or CHAA.

Preferably, the compatibilizer is present in the blend at no more than about 10% by weight.

The cross-linked blend has undergone chemical bonding between EVOH and the oxygen scavenging polymer. Preferably, the cross-link is an ester bond formed by transesterification between a hydroxy group on EVOH and an ester or carboxy on the oxygen scavenging polymer.

In order to aid cross-linking of the components of the blend, a transesterification catalyst can be added. Preferably, the transesterification catalyst is a strong non-oxidizing acid, a Group I alkoxide, or a Group IVB alkoxide, such as di-butyl tin dilaurate, sodium methoxide, toluene sulfonic acid, tetrabutyl titanate, tetraisopropyl titanate, or tetraethyl titanate. More preferably, the catalyst is a tetraalkyl titanate.

The transesterification catalyst can be present in the blend up to about 5% by weight, preferably less than about 1%.

The cross-linked blend can also comprise a compatibilizer, as described above.

Other compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the oxygen barrier composition comprising the blend of EVOH and the oxygen scavenging polymer.

In the blend, the composition optionally can further comprise a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counter ions for the metal include, but are not limited to, chloride, acetate, oleate, stearate, palmitate, 2-ethylhexanoate, neodecanoate, or naphthenate, preferably $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the composition, based on the metal content only (excluding ligands, counter ions, etc.). In a packaging article, the transition metal can be formed in a high oxygen barrier layer comprising the oxygen barrier composition of the invention, or in a layer adjacent to the high oxygen barrier layer.

Another compound that is often preferably added to the composition is a photoinitiator, or a blend of different photoinitiators, especially if antioxidants are included to prevent premature oxidation of the oxygen scavenging polymer.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation of oxygen scavenging by the oxygen scavenging polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in copending U.S. patent application Ser. No. 08/857,325, filed May 16, 1997. These compounds act as effective photoinitiators to initiate oxygen scavenging activity in the oxygen barrier composition of the present invention. Such benzophenone derivatives have a very low degree of extraction from oxygen scavenging compositions, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR″$_2$—, wherein each R″ is individually selected from alkyl groups containing from 1 to 12 carbon atoms, aryl groups containing 6 to 12 carbon atoms, or alkoxy groups containing from 1 to 12 carbon atoms; —NR‴—, wherein R‴ is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R″, when present, are individually selected from alkyl, aryl, alkoxy, phenoxy, or alicylic groups containing from 1 to 24 carbon atoms, or halides. Each benzophenone moiety can have from 0 to 9 substituents.

Preferably, the combined molecular weight of the A and R″ groups is at least about 30 g/mole. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by a high oxygen barrier layer comprising the oxygen barrier composition upon exposure to radiation. The amount of photoinitiator can vary. In many instances, the amount will depend on the blend ratio or the particular oxygen scavenging polymer used, the wavelength and intensity of UV radiation used, the nature and amount of antioxidants used, as well as the type of photoinitiator used. The amount of photoinitiator also depends on the intended use of the composition. For instance, if the photoinitiator-containing component is placed underneath a layer which is somewhat opaque to the radiation used, more initiator may be needed. For most purposes, however, the amount of photoinitiator, when used, will be in the range of 0.01 to 10% by weight of the oxygen barrier composition.

Other additives can be added to further facilitate or control the initiation of oxygen scavenging properties. Also, additional components such as a structural polymer or polymers can be added to render the layer more adaptable for use in a packaging article. Particular additives and components to be included in the oxygen barrier composition can be readily chosen by the skilled artisan, depending on the intended use of the oxygen barrier composition and other parameters.

Antioxidants may be used in the composition to control scavenging initiation. An antioxidant as defined herein is a material which inhibits oxidative degradation or crosslinking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the high oxygen barrier layer of the packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight of the composition. However, additional amounts of antioxidant may also be added if it is desired to tailor the induction period as described above.

Other additives which can be included in the high oxygen barrier layer include, but are not necessarily limited to, fillers, pigments, dyestuffs, stabilizers, processing aids, plasticizers, fire retardants, and anti-fog agents, among others.

Any other additives employed normally will not comprise more than 10% of the composition by weight, with preferable amounts being less than 5% by weight of the composition.

The oxygen barrier composition can also comprise film- or rigid-article-forming structural polymers. Such polymers are thermoplastic and render the oxygen barrier composition more adaptable for use as a high oxygen barrier layer in a packaging article. They also may, to some extent, provide a barrier to oxygen entry into the packaging article. Suitable structural polymers include, but are not limited to, polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth) acrylates, ethylene-(meth)acrylic acid, or ethylene-(meth) acrylic acid ionomers. In rigid articles, such as beverage containers, PET is often used. Blends of different structural polymers may also be used. However, the selection of the structural polymer largely depends on the article to be manufactured and the end use thereof Such selection factors are well known in the art. For instance, the clarity, cleanliness, effectiveness as an oxygen scavenger, barrier properties, mechanical properties, or texture of the article can be adversely affected by a blend containing a structural polymer which is incompatible with the oxygen scavenging polymer.

Preferably, the structural polymer is PET.

The oxygen barrier composition can be stored after being made, or can be made as part of a process of forming a packaging article, as will be described below.

In addition to the oxygen barrier layer, if the packaging article is a multilayer article, it can comprise other layers useful in a flexible or rigid multilayer packaging article.

As stated above, if a transition metal salt is included in the packaging article to increase the rate of oxygen scavenging or reduce the induction time, the transition metal can be included either in the oxygen barrier layer or in a layer adjacent to the oxygen barrier layer. Any transition metal salt described above can be formed in the adjacent layer.

The oxygen barrier layer can also comprise a photoinitiator, an antioxidant, or both, as described above. Other additives can also be included as desired. Also, the oxygen barrier layer can comprise a structural polymer, as described above.

A multilayer packaging article of the present invention can also comprise at least one structural layer located to the interior, the exterior, or both of the oxygen barrier layer. The structural layer or layers comprise a structural polymer that imparts useful structural properties, such as rigidity, flexibility, or strength, among others, to the packaging article.

Preferably, the structural polymer is selected from polyethylene, low density polyethylene, very low density polyethylene, ultra-low density polyethylene, high density it polyethylene, polyethylene terephthalate (PET), polyvinyl chloride, ethylene-vinyl acetate, ethylene-alkyl (meth) acrylates, ethylene-(meth)acrylic acid, or ethylene-(meth) acrylic acid ionomers. More preferably, the structural polymer is PET.

Also, a multilayer packaging article may comprise an oxygen scavenging layer, comprising an oxygen scavenging polymer and, optionally, other additives, such as a photoinitiator, a transition metal catalyst, an antioxidant, a structural polymer, or others, alone or in any combination, as described above. The oxygen scavenging layer can be an integral part of the packaging article, or it can be a liner, coating, sealant, gasket, adhesive, non-adhesive insert, or fibrous mat insert in the packaging article.

Additionally, a multilayer packaging article according to the present invention may further comprise at least one oxygen barrier layer, i.e. a layer having an oxygen transmission rate equal to or less than 500 cubic centimeters per square meter ($cc/m^2$) per day per atmosphere at room temperature (about 25° C.), wherein the layer does not comprise an oxygen scavenging polymer. Typical oxygen barrier layers comprise poly(ethylene vinylalcohol), polyacrylonitrile, polyvinyl chloride, poly(vinylidene dichloride), polyethylene terephthalate, silica, polyamides, or mixtures thereof. However, because the blend of EVOH and an oxygen scavenging polymer inhibits oxygen transmission to a high degree, the need for a separate oxygen barrier layer as described in the art is reduced and may, depending on the form of the packaging article and the intended use, be dispensed with entirely, if desired.

Other additional layers of a multilayer packaging article may include one or more layers which are permeable to oxygen. In one packaging article, preferred for flexible packaging of food and scavenging of oxygen found in the packaged food, the layers include, in order starting from the outside of the package to the innermost layer of the package, (i) a high oxygen barrier layer, (ii) an optional oxygen scavenging layer, and (iii) an optional oxygen-permeable layer. Control of the oxygen barrier property of (i) limits the rate of oxygen entry to the oxygen scavenging moieties in layer (ii), and thus slows the consumption of oxygen scavenging capacity by atmospheric oxygen. Control of the oxygen permeability of layer (iii) allows setting the rate of oxygen scavenging for the overall structure independent of the composition of the scavenging component (ii). Furthermore, layer (iii) can provide a barrier to migration of the components of the outer layers, or by-products of the reaction of such components with oxygen or other reactants, into the package interior. Even further, layer (iii) can improve the heat-sealability, clarity, or resistance to blocking of the multilayer packaging article.

Further additional layers, such as adhesive layers, may also be used in the multilayer packaging article. Compositions typically used for adhesive layers include anhydride functional polyolefins and other well-known adhesive layers.

In another embodiment, the present invention relates to a method of making an oxygen barrier composition comprising an ethylene/vinyl alcohol copolymer (EVOH) and an oxygen scavenging polymer, comprising blending EVOH and the oxygen scavenging polymer.

EVOH and the oxygen scavenging polymer are as described above. Typically, EVOH and the oxygen scavenging polymer are provided as a solid formulation, such as pellets or a powder.

The blend can be prepared by mixing EVOH and the oxygen scavenging polymer in any appropriate apparatus. Typically, EVOH and the oxygen scavenging polymer are mixed together, heated to melting and stirred to homogeneity, and the homogenous melt is then extruded. The extruded melt is then typically cooled and pelletized to form pellets of the blend. However, other forms of the blend, such as a powder, are possible. Other techniques of preparing the blend may occur to one of ordinary skill in the art.

To aid mixing of EVOH and the oxygen scavenging polymer, the blending step can further comprise blending a compatibilizer with EVOH and the oxygen scavenging polymer. The compatibilizer is as described above.

If a cross-linked blend is desired, the mixing of EVOH and the oxygen scavenging polymer can take place during a reactive extrusion process. If cross-linking is to be performed by transesterification of EVOH and the oxygen scavenging polymer, such transesterification can be according to the teachings of Ching et al., U.S Pat. No. 5,627,239, which is incorporated herein by reference. Typically, this involves mixing EVOH and the oxygen scavenging polymer in a reactive extruder at a temperature between about 180° C. and about 250° C. for between about 5 sec and about 2 mix. Preferably, the blend further comprises a transesterification catalyst. The transesterification catalyst is as described above.

The blend can also comprise other additives, such as a transition metal salt, a photoinitiator, an antioxidant, a structural polymer, or any combination thereof, among others, as described above.

After being made, the blend can be stored for at least several days, and preferably indefinitely, or it can be made as part of a method of forming an oxygen scavenging layer in a packaging article, as described below. In such a method, the blended composition is fed from the extruder or other blending apparatus directly into further steps of the method.

In another embodiment, the present invention relates to a method of forming a high oxygen barrier layer in a packaging article, comprising: (i) providing an oxygen barrier composition comprising an ethylene/vinyl alcohol copolymer (EVOH) and an oxygen scavenging polymer; and (ii) forming the composition into the packaging article or the high oxygen barrier layer thereof.

The packaging article can be flexible or rigid, single-layer or multilayer, as described above. EVOH and the oxygen scavenging polymer are also as described above. Preferably, the oxygen scavenging polymer comprises an ethylenic backbone and a cycloalkenyl group having the structure I:

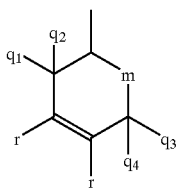

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

More preferably, the oxygen scavenging polymer is EMCM, EVCH, or CHAA.

The forming step can be by any technique appropriate depending on the oxygen barrier composition, the packaging article, and other parameters. As mentioned above, single layered packaging articles typically can be prepared by solvent casting, injection molding, blow molding, or extrusion, among others. Packaging articles with multiple layers are typically prepared using coextrusion, injection molding, blow molding, coating, or lamination, among others.

If a transition metal catalyst is desired for inclusion in the packaging article, to catalyze oxygen scavenging by the composition, the forming step comprises forming a transition metal catalyst into the high oxygen barrier layer or a layer adjacent to the high oxygen barrier layer of the packaging article.

The oxygen barrier composition can also comprise a photoinitiator, an antioxidant, a structural polymer, or other additives as described above.

In addition to the high oxygen barrier layer, the packaging article to be formed can comprise other layers, such as an oxygen barrier layer not comprising an oxygen scavenging polymer, a structural layer, an oxygen scavenging layer, or a seal layer or food contact layer forming the interior surface of the packaging article, among others. Depending on the desired form of the packaging article, the forming step can comprise forming the packaging article as a single layer film, a multilayer film, a single layer rigid article, or a multilayer rigid article.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of a Multi-layer Film with a High Oxygen Barrier Core Layer

A series of four dry blend samples were prepared from pellets of ethylene-vinyl alcohol copolymer (EVOH), ethylene/methyl acrylate/cyclohexenylmethyl acrylate terpolymer (EMCM) and an ethylene/methyl acrylate copolymer-(EMAC-) based cobalt masterbatch (containing 1 wt % tribenzoyl triphenylbenzene (BBP[3]) and 1 wt % cobalt as cobalt oleate) by mixing in a polyethylene bag. The samples differed in the weight ratio among EVOH, EMCM, and the cobalt masterbatch. A fifth sample consisting of EVOH was prepared as a control. The proportions of the ingredients in the blends are shown in Table 1.

TABLE 1

| | Blend Composition | | |
| --- | --- | --- | --- |
| Material | EVOH, % by wt. | EMCM % by wt. | Masterbatch % by wt. |
| Sample 1 | 95 | 4.5 | 0.5 |
| Sample 2 | 90 | 9 | 1 |
| Sample 3 | 87 | 9 | 4 |
| Sample 4 | 80 | 18 | 2 |
| Sample 5 | 100 | 0 | 0 |

The EVOH (Soarnol A4412 grade, from Nippon Synthetic Chemical Industry Co.) used contained 44 mole % ethylene content and had a melt index of 12 g/10 min at 210° C. and a loading of 2.16 kg, and a melting point of 164° C. The EVOH resin was dried at 90° C. for 3 hours under vacuum to remove residual moisture.

EMCM, the oxygen scavenging polymer used, was as discussed in the previous section, and was obtained from Chevron Chemical Co.

The EMAC-based cobalt masterbatch (containing 1 wt % BBP[3] and 1 wt % cobalt as cobalt oleate) was obtained from Chevron Chemical Co.

The above four dry blends and the control (Samples 1–5) were melt blended on a Hakke twin screw extruder at temperature range of 190° C. to 220° C. at 30 rpm screw speed. A three layer film was cast from each composition from a Randcastle coextrusion machine, with the oxygen barrier blend composition or control as core layer and commercial polyethylene as interior and exterior skin layers. The dimension of the three layer films was controlled at 0.5/1.0/0.5 mil. The temperature settings for film casting were in the range of 430° F. and screw speeds were in the range of 15 to 30 rpm. The material of each individual layer was fed into one of the two extruders of the Randcastle machine. While in the die, the layers were juxtaposed and combined, then emerged from the die as a three-layer film. After exiting the die, the film was oriented monoaxially: the extrudate was cast onto a first controlled temperature casting roll with stretching in the machine direction and the film was then collected at the second roll. All the films made were transparent with light color.

EXAMPLE 2

Oxygen Transmission Test on Mocon

The films prepared in Example 1 were tested for oxygen permeability using a Mocon Ox-Trans 2/20 ML system at 23° C. Nitrogen containing 2% hydrogen was used as carrier gas to flush both sides of the film at 10 cc/min flow rate for 14 hrs before testing. Air was used as test gas at 10 cc/min flow rate. The oxygen permeability was measured in cubic centimeters per square meter per 24 hours. The film size for the test was 50 cm². Oxygen scavenging by EMCM in the high oxygen barrier layer was triggered by exposing the film to UV light at 254 nm.

TABLE 2

Oxygen Permeability

| Material | EVOH, % by wt. | EMCM % by wt. | Masterbatch % by wt. | Oxygen Permeability cc/m² · day |
|---|---|---|---|---|
| Sample 1 | 95 | 4.5 | 0.5 | — |
| Sample 2 | 90 | 9 | 1 | 4.16 |
| Sample 3 | 87 | 9 | 4 | 0.62 |
| Sample 4 | 80 | 18 | 2 | 0.0 |
| Sample 5 | 100 | 0 | 0 | 4.64 |

From the above table, it is apparent that the presence of the oxygen scavenging polymer EMCM in the EVOH matrix can significantly lower the oxygen permeability of a film comprising a high oxygen barrier layer, relative to films comprising oxygen barrier layers known in the art. At 9 wt % loading of EMCM (sample 3), the oxygen permeability was lowered about 7-fold with the presence of sufficient cobalt masterbatch. At 18 wt % loading of EMCM, the oxygen permeability was lowered to substantially zero.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Ching et al., U.S. Pat. No. 5,627,239

What is claimed is:

1. An oxygen barrier composition, comprising:
   a blend of an ethylene/vinyl alcohol copolymer (EVOH), an oxygen scavenging polymers other than said EVOH and a transition metal salt, wherein the oxygen scavenging polymer comprises an ethylenic backbone and a pendant cycloalkenyl group having the structure I:

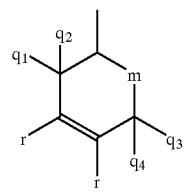

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen.

2. The composition of claim 1, wherein the oxygen scavenging polymer is ethylene/methyl acrylate/cyclohexenylmethyl acrylate terpolymer (EMCM), ethylene/vinyl cyclohexene copolymer (EVCH), or cyclohexenylmethyl acrylate homopolymer (CHAA).

3. The composition of claim 1, further comprising a compatibilizer.

4. The composition of claim 3, wherein the compatibilizer comprises a block copolymer of (i) EVOH, ethylene/vinyl acetate copolymer, ethylene/styrene copolymer, polyacrylonitrile, polyvinyl chloride (PVC), poly (vinylidene dichloride), polyethylene terephthalate (PET), polyethylene napthalate, or polyamide and (ii) a polymer comprising an ethylenic backbone and a cycloalkenyl group having the structure I:

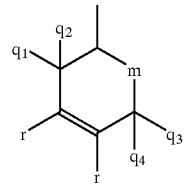

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen.

5. The composition of claim 4, wherein the compatibilizer comprises a block copolymer of EVOH with EMCM, EVCH, or CHAA.

6. The composition of claim 1, wherein EVOH and the oxygen scavenging polymer are cross-linked.

7. The composition of claim 6, wherein the cross-link is an ester.

8. The composition of claim 6, further comprising a transesterification catalyst.

9. The composition of claim 8, wherein the transesterification catalyst is selected from di-butyl tin dilaurate, sodium methoxide, toluene sulfonic acid, tetrabutyl titanate, tetraisopropyl titanate, or tetraethyl titanate.

10. The composition of claim 9, wherein the catalyst is selected from tetrabutyl titanate, tetraisopropyl titanate, or tetraethyl titanate.

11. The composition of claim 1, wherein the transition metal is selected from cobalt, copper, nickel, iron, manganese, rhodium, or ruthenium.

12. The composition of claim 1, wherein the transition metal salt comprises a counterion selected from $C_1$–$C_{20}$ alkanoates.

13. The composition of claim 1, wherein the transition metal salt is cobalt oleate, cobalt stearate, or cobalt neodecanoate.

14. The composition of claim 1, further comprising a photoinitiator.

15. The composition of claim 14; wherein the photoinitiator is selected from benzophenone derivatives containing at least two benzophenone moieties and having the formula:

$$A_a(B)_b$$

wherein

A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

16. The composition of claim 15, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer.

17. The composition of claim 1, further comprising an antioxidant.

18. The composition of claim 17, wherein the antioxidant is selected from 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, or dilaurylthiodipropionate.

19. The composition of claim 1, further comprising a structural polymer.

20. The composition of claim 19, wherein the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, or ethylene-(meth)acrylic acid ionomers.

21. The composition of claim 20, wherein the structural polymer is PET.

\* \* \* \* \*

UNITED STATES PATENT AND TRADEMARK OFFICE
CERTIFICATE OF CORRECTION

PATENT NO. : 6,525,123 B1  
DATED : February 25, 2003  
INVENTOR(S) : Hu Yang, Ta Yen Ching and Gangfeng Cai It is certified that error appears in the above-identified patent and that said Letters Patent is hereby corrected as shown below:

<u>Column 14,</u>
Line 11, delete "polymers" and insert -- polymer, --.

Signed and Sealed this

Fifteenth Day of April, 2003

JAMES E. ROGAN
*Director of the United States Patent and Trademark Office*